United States Patent
Petersson et al.

(10) Patent No.: US 11,211,719 B2
(45) Date of Patent: Dec. 28, 2021

(54) ANTENNA ARRANGEMENT AND METHOD FOR BEAMFORMING

(71) Applicant: Telefonaktiebolaget LM Ericsson (publ), Stockholm (SE)

(72) Inventors: Sven Petersson, Sävedallen (SE); Andreas Nilsson, Gothenburg (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 387 days.

(21) Appl. No.: 15/557,958

(22) PCT Filed: Jul. 17, 2017

(86) PCT No.: PCT/EP2017/067988
§ 371 (c)(1),
(2) Date: Sep. 13, 2017

(87) PCT Pub. No.: WO2019/015737
PCT Pub. Date: Jan. 24, 2019

(65) Prior Publication Data
US 2019/0020123 A1 Jan. 17, 2019

(51) Int. Cl.
*H01Q 21/22* (2006.01)
*H04B 7/06* (2006.01)
(Continued)

(52) U.S. Cl.
CPC ............. *H01Q 21/22* (2013.01); *H01Q 3/24* (2013.01); *H01Q 21/24* (2013.01);
(Continued)

(58) Field of Classification Search
CPC ...... H01Q 21/22; H01Q 21/062; H01Q 1/246; H01Q 1/38; H01Q 21/28; H01Q 11/04;
(Continued)

(56) References Cited

U.S. PATENT DOCUMENTS

| 2002/0021246 A1* | 2/2002 | Martek ................. H01Q 1/523 |
| | | 342/373 |
| 2013/0057432 A1 | 3/2013 | Rajagopal et al. |

(Continued)

FOREIGN PATENT DOCUMENTS

| JP | 2001352215 A | 12/2001 |
| JP | 2013519276 A | 5/2013 |

(Continued)

OTHER PUBLICATIONS

International Search Report and Written Opinion issued in International Application No. PCT/EP2017/067988, dated Apr. 4, 2018, 15 pages.

(Continued)

*Primary Examiner* — Robert Karacsony
(74) *Attorney, Agent, or Firm* — Rothwell, Figg, Ernst & Manbeck, P.C.

(57) ABSTRACT

An antenna arrangement (1) comprising a dual polarized antenna array (10) and a reconfigurable feed network (17) connected thereto is provided. The dual polarized antenna array (10) comprises a number of radiating antenna elements and the reconfigurable feed network (17) comprises switching means (20) for switching the feed network (17) between: a first mode providing single polarization beamforming, SPBF, in which first mode the feed network (17) is arranged such as to connect all antenna elements having a first polarization P1 to a first port, A, and all antenna elements having a second polarization P2 to a second port, B, and a second mode providing dual-polarization beamforming, DPBF, in which second mode the feed network (17) connects a part of all antenna elements having a first polarization P1 and a part of all antenna elements having a second polarization to the first port, A, and a remaining part of all antenna elements having the first polarization P1 and the remaining part of all antenna elements having the second (Continued)

polarization P2 to the second port, B. A method (30), computer program (42) and computer program product (41) are also provided.

14 Claims, 5 Drawing Sheets

(51) Int. Cl.
*H04B 7/10* (2017.01)
*H01Q 21/24* (2006.01)
*H04B 7/0456* (2017.01)
*H01Q 3/24* (2006.01)
*H01Q 25/00* (2006.01)
*H01Q 3/34* (2006.01)
*H01Q 21/00* (2006.01)

(52) U.S. Cl.
CPC ......... *H01Q 25/001* (2013.01); *H04B 7/0469* (2013.01); *H04B 7/0617* (2013.01); *H04B 7/10* (2013.01); *H01Q 3/34* (2013.01); *H01Q 21/0006* (2013.01)

(58) Field of Classification Search
CPC .. H01Q 3/24; H01Q 3/26; H01Q 3/34; H01Q 21/0006; H01Q 21/061; H01Q 21/065; H01Q 21/067; H01Q 21/24; H01Q 25/001; H01Q 3/2605; H01Q 3/2617; H01Q 3/2623; H01Q 3/28; H01Q 3/30; H01Q 3/32; H01Q 3/38; H01Q 3/40; H01Q 3/42; H01Q 21/0025; H01Q 21/06; H01Q 21/08; H01Q 21/26; H04B 7/04; H04B 7/0469; H04B 7/0617; H04B 7/10
USPC .......................... 343/844, 725, 776, 824, 879
See application file for complete search history.

(56) References Cited

U.S. PATENT DOCUMENTS

2016/0285174 A1    9/2016  Chistyakov et al.
2019/0037416 A1*   1/2019  Linehan ................ H01Q 3/247

FOREIGN PATENT DOCUMENTS

| JP | 2018514111 A | 5/2018 |
| KR | 10-2004-0084935 A | 10/2004 |
| WO | 2016102010 A1 | 6/2016 |

OTHER PUBLICATIONS

A. Ouacha et al., "Wideband Antenna Arrays with Reconfigurable Beamforming and Beamshaping", IEEE, 2007 (4 pages).

* cited by examiner

ANTENNA ARRANGEMENT AND METHOD FOR BEAMFORMING

CROSS REFERENCE TO RELATED APPLICATION(S)

This application is a 35 U.S.C. § 371 National Stage of International Patent Application No. PCT/EP2017/067988, filed Jul. 17, 2017, designating the United States, the disclosure of which is incorporated by reference.

TECHNICAL FIELD

The technology disclosed herein relates generally to the field of antenna technology, and in particular to an antenna arrangement comprising a dual polarized antenna array and a reconfigurable feed network connected thereto, to a method, computer program and computer program product.

BACKGROUND

There is a large variety of requirements for the next generation of mobile communications system (5G). This implies that frequency bands at many different carrier frequencies will be needed. For example, low bands will be needed in order to achieve sufficient coverage and higher bands (e.g. millimeter wave (mmW), i.e. near and above 30 GHz) will be needed to reach a required capacity. At high frequencies the propagation properties are more challenging and beamforming might be required both at a transmission/reception point (TRP, e.g. an access point such as a base station) and at a communication device, e.g. a user equipment (UE), in order to reach a sufficient link budget. In the following base station and UE are used as examples on transmission/reception points.

There are basically three different implementations of beamforming, both at the base station and at the UE: analog beamforming, digital beamforming and hybrid beamforming. Each implementation has its advantages and disadvantages. Digital beamforming is the most flexible solution but also the most expensive due to the large number of required radio and baseband chains. Analog beamforming is the least flexible but also less costly to manufacture owing to reduced number of radio and baseband chains. Hybrid beamforming is a compromise between the analog and digital beamforming.

Depending on cost and performance requirements of different UEs, different implementations will be needed. One type of beamforming antenna architecture that has been agreed to study in 3$^{rd}$ Generation Partnership Project (3GPP) for New Radio (NR) access technology is the concept of antenna panels, both at the base station and at the UE. An antenna panel is an antenna array of single- or dual-polarized elements with typically one transmit/receive unit (TXRU) per polarization. An analog distribution network with phase shifters is used to steer the beams of each panel.

For UEs the incoming signals can arrive from many different directions, hence it is beneficial to have an antenna implementation at the UE which can generate omni-directional-like coverage. One way to increase the omni-directional coverage at an UE is to apply dual-polarized beamforming. The dual-polarized panels are then used for generating wide beams.

Wide beams covering a whole cell can be useful also at the base station, for example when simultaneously transmitting/receiving information to/from multiple UEs in the cell, or for broadcasting of signals etc. Hence, the dual-polarized panels may be useful also at base stations in order to generate wide beams by means of dual polarized beamforming.

A dual-polarized beamforming scheme is known, wherein wide beams having a desired beamwidth and beam shape can be created using a large active antenna array. In this scheme, the beam shape is often much wider than the minimum beamwidth that the antenna panel size offers. However, this is obtained at the cost of using both polarizations to form the beam. The dual port antenna panel will then offer only a single port.

SUMMARY

An objective of the present disclosure is to provide efficient beamforming in a cost-efficient way. A particular objective is to enable the use of an antenna panel for both dual-polarized beamforming and single-polarized beamforming. These objectives and others are achieved by the methods, devices, computer programs and computer program products according to the appended independent claims, and by the embodiments according to the dependent claims.

The objective is according to an aspect achieved by an antenna arrangement comprising a dual polarized antenna array and a reconfigurable feed network connected thereto. The dual polarized antenna array comprises a number of radiating antenna elements and the reconfigurable feed network comprising switching means for switching the feed network between:

a first mode providing single polarization beamforming, SPBF, in which first mode the feed network is arranged such as to connect all antenna elements having a first polarization P1 to a first port, A, and all antenna elements having a second polarization P2 to a second port, B, and a second mode providing dual-polarization beamforming, DPBF, in which second mode the feed network connects a part of all antenna elements having a first polarization P1 and a part of all antenna elements having a second polarization to the first port, A, and a remaining part of all antenna elements having the first polarization P1 and the remaining part of all antenna elements having the second polarization P2 to the second port, B.

The objective is according to an aspect achieved by a method for beamforming performed by a device using an antenna arrangement comprising a dual polarized antenna array and a reconfigurable feed network connected thereto. The dual polarized antenna array comprises a number of radiating antenna element. The method comprises:

switching the feed network to a first mode providing single polarization beamforming, SPBF, in which first mode the feed network is arranged such as to connect all antenna elements having a first polarization P1 to a first port, A, and all antenna elements having a second polarization P2 to a second port, B, and switching the feed network to a second mode providing dual-polarization beamforming, DPBF, in which second mode the feed network connects a part of all antenna elements having a first polarization P1 and a part of all antenna elements having a second polarization P2 to the first port, A, and a remaining part of all antenna elements having the first polarization P1 and the remaining part of all antenna elements having the second polarization P2 to the second port, B.

The method and reconfigurable dual polarized (analog) antenna panel provides a number of advantages. For instance, the reconfigurable dual polarized analog antenna panel enables the use of either two single polarized ports or two ports formed by means of dual polarization. Dual polarized beamforming is in many cases applied where the desired beamwidth is much larger than the minimum beamwidth that the antenna array can offer. So, in these cases, when dual-polarized beamforming is applied, reconfiguring the antenna array to two smaller antenna arrays has no negative impact on the resulting beamshape but gives the positive effect of still having two ports. The method provides a cost-efficient solution, enabling the use of both narrow beams for e.g. user data, and also wide beams for e.g. system information, while offering two ports also for wide beamforming.

The objective is according to an aspect achieved by a computer program for a device. The computer program comprises computer program code, which, when run on at processing circuitry of the device causes the device to perform the method as above.

The objective is according to an aspect achieved by a computer program product comprising a computer program as above and a computer readable means on which the computer program is stored.

Further features and advantages of the embodiments of the present teachings will become clear upon reading the following description and the accompanying drawings.

DETAILED DESCRIPTION

Figure 1:
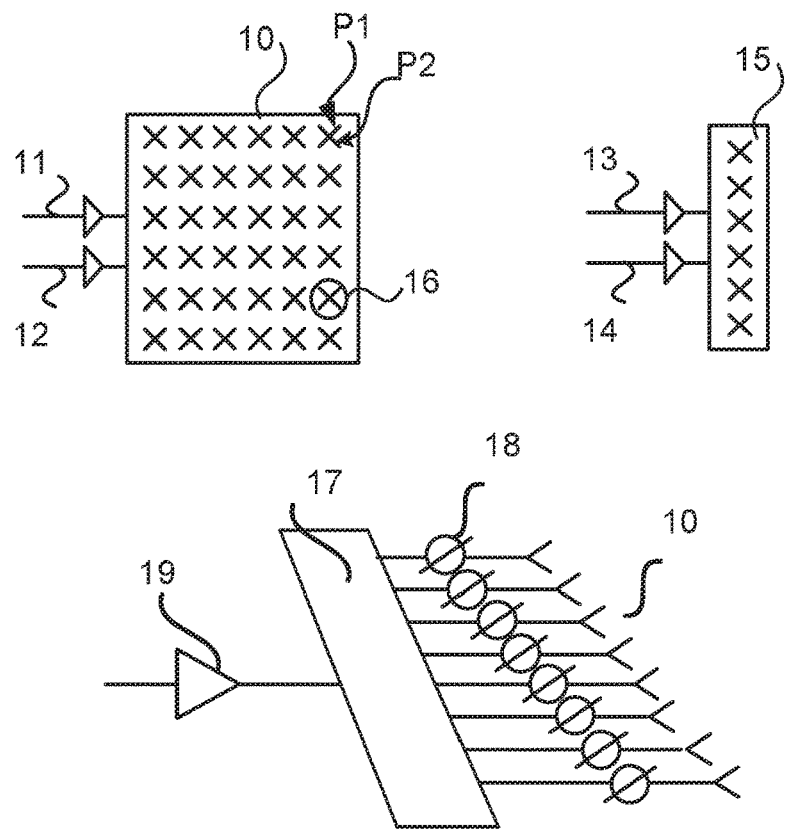
FIG. 1 illustrates an antenna panel.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, according to various embodiments of the present teachings an antenna panel with a reconfigurable distribution feed network is provided, such that either a single polarization beamforming (SPBF) or a dual-polarized beamforming (DPBF) can be applied.

FIG. 1 illustrates antenna arrays (also denoted antenna panels), and in particular two examples of dual-polarized analog antenna arrays. To the left, a two-dimensional (planar) antenna array 10 is shown and to the right a one-dimensional (linear) antenna array 15 is shown. Each antenna array 10, 15 comprises a number of radiating dual-polarized elements (one such element encircled and indicated at reference numeral 16), and each polarization P1, P2 is connected to a respective transmit/receive unit (TXRU) 11, 12; 13, 14. In the illustrated case, each antenna array 10, 15 is connected to one TXRU 11, 12; 13, 14 per polarization.

At lowermost part of FIG. 1 the antenna array 10, 15 is shown in some more detail. An antenna front end comprises the antenna array 10 of antenna elements described above. The antenna element is connected via a feed network 17 to the ports having orthogonal polarization (only one port shown in lowermost part of FIG. 1), as described above.

The feed network 17 (sometimes denoted distribution network or distribution feed network) may comprise phase shifters 18 which are used for steering the beams of each antenna array 10, 15. The feed network 17 may also comprise power amplifiers 19. The feed network 17 combines all antenna elements of the same polarization (P1, P2) to a first port. That is, the feed network 17 combines all antenna elements of a first polarization P1 to a first port A, and all antenna elements of a second polarization P2 to a second port B. As a note on vocabulary, the "feed network" may be considered to be all components between a beam-forming part of an antenna arrangement and a receiver's first amplifier (denoted radio frequency (RF) front end, or low noise amplifier (LNA)). For a transmitting antenna, the feed network comprises all components after the last power amplifier, and may also comprise an antenna tuner unit and impedance matching sections at the antenna.

It is noted that the antenna arrays 10, 15 may be arranged in or connected to a communication device and/or a TRP. The communication device 1 may for instance, be a UE, e.g. a mobile phone or a smart phone, a tablet computer or the like. The TRP 2 may, for instance, be an access point such as base station, evolved eNode B, eNB, gNB etc.

Figure 2:
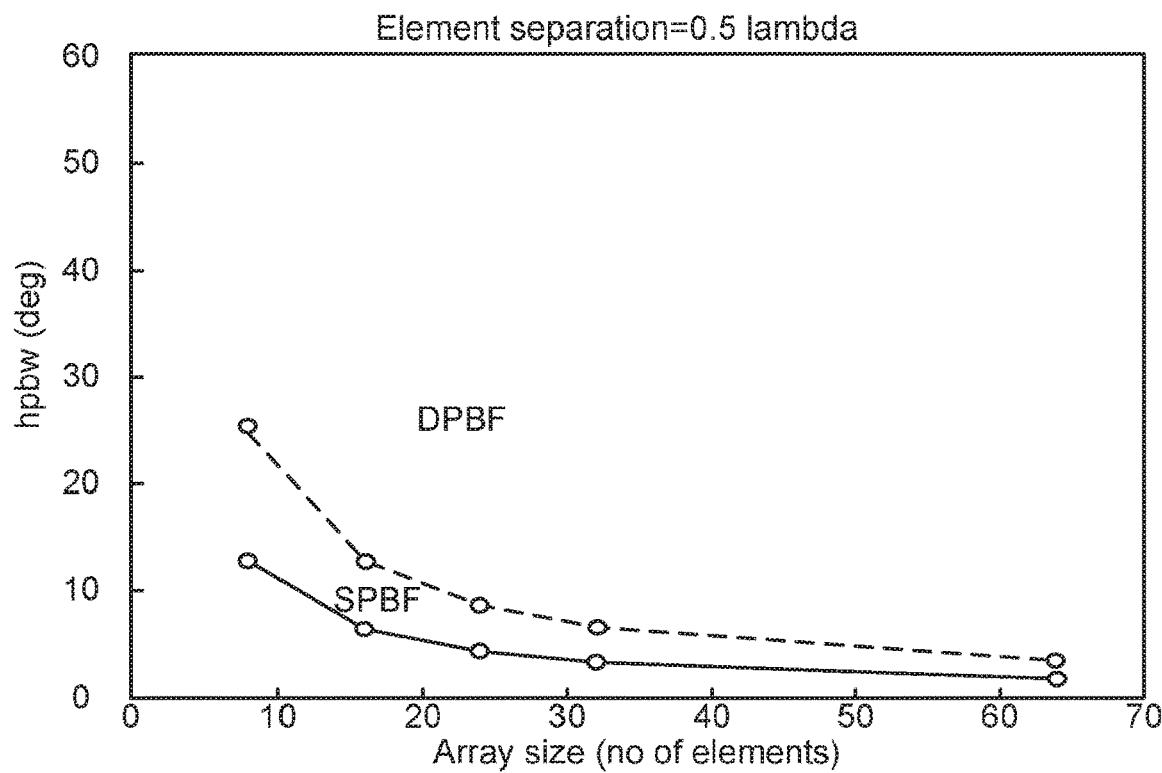
FIG. 2 is a graph showing beamwidth as function of array size for uniform tapering.

FIG. 2 is a graph showing beamwidth as function of array size. In the figure, regions are shown, in terms of half-power beamwidths (hpbw) for the different configuration modes (SPBF or DPBF), in which the configurations according to the present teachings are most advantageously used. As noted earlier, the reconfigurable dual polarized analog antenna panel according to the present teachings enables the use of either two single polarized ports or two ports formed by means of dual polarization. Dual polarized beamforming is in many cases applied where the desired beamwidth is much larger than the minimum beamwidth that the antenna array can offer. So, in these cases, when dual-polarized beamforming is applied, reconfiguring the antenna array to two smaller antenna arrays has no negative impact on the resulting beamshape but gives the positive effect of still having two ports.

Figure 3:
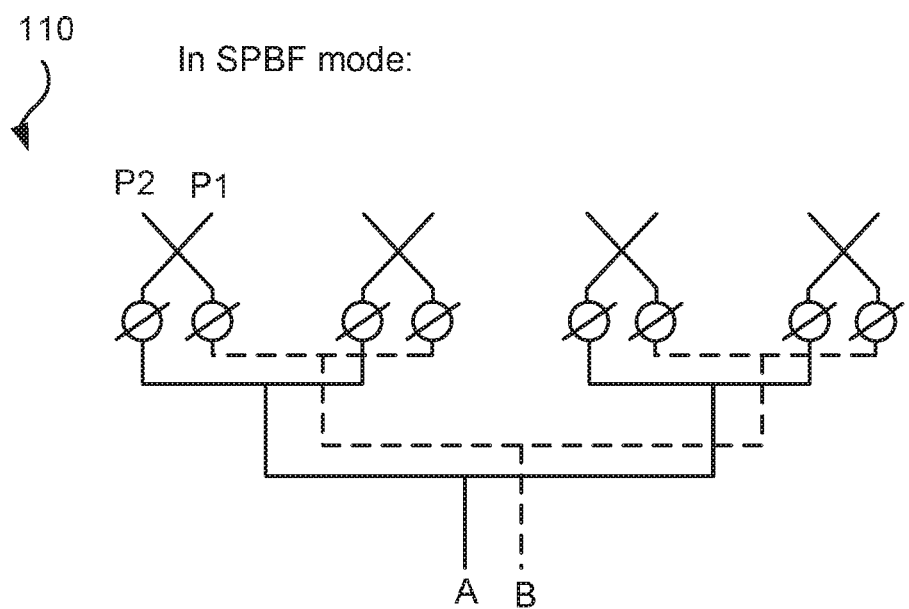
FIG. 3 illustrates a prior art panel configuration.
Figure 4:
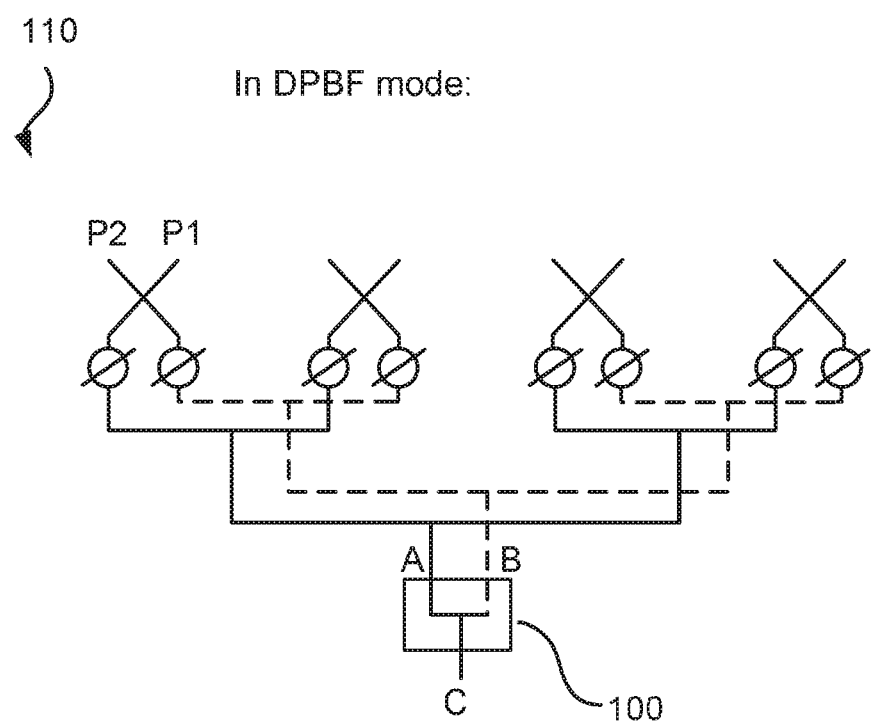
FIG. 4 illustrates a prior art configuration with dual polarization beamforming implemented on baseband resulting in single port operation.

FIGS. 3 and 4 illustrate a conventional antenna array configuration. The antenna array 110 typically comprises a set of radiating antenna elements, phase shifters and a feed network as has been described. In FIG. 3 the antenna array 110 is shown in single polarized beamforming mode (SPBF)

and in FIG. 4, the antenna array 110 is shown in dual polarization beamforming (DPBF) mode. If dual polarization beamforming is to be applied to the conventional antenna array 110, for instance in order to create wide beams, the signal on the first port A and the signal on the second port B are combined in a combination step indicated at reference numeral 100 in FIG. 4. Since both ports A, B will be combined, this then results in a single port array C, and the antenna array offers only this single port.

Figure 5:
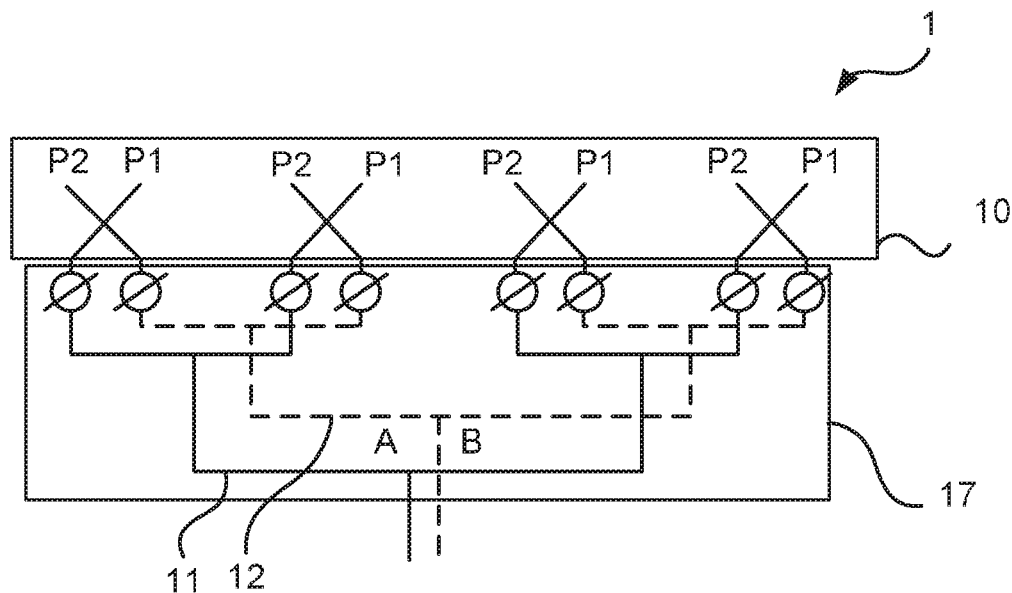
FIG. 5 illustrates a reconfigurable network according to the present teachings, in single polarization mode.

FIG. 5 illustrates an antenna arrangement 1 according to embodiments of the present teachings. The antenna arrangement 1 comprises an antenna array 10 as described, for instance, in relation to FIGS. 1 and 2. However, instead of having a combination step 100 closest to the ports A, B, as in the prior art (as shown in FIG. 4), the antenna array 10 in accordance with embodiments of the present teachings have a reconfigurable feed network 17 closest to the ports A, B. That is, the antenna arrangement 1 comprises a reconfigurable feed network 17, and in particular a feed network 17 that can be configured in one mode and reconfigured to another mode as will be described, and switched there between. In FIG. 5, the reconfigurable feed network 17 is in a first mode, and in particular in a single polarization beamforming mode. In this first mode, the reconfigurable feed network 17 connects the antenna elements of the antenna array 10 to the two ports as in the prior art case illustrated in FIG. 3. That is, all elements with the first polarization P1 are connected to the first port A, and all elements with the second polarization P2 are connected to the second port B.

Figure 6:
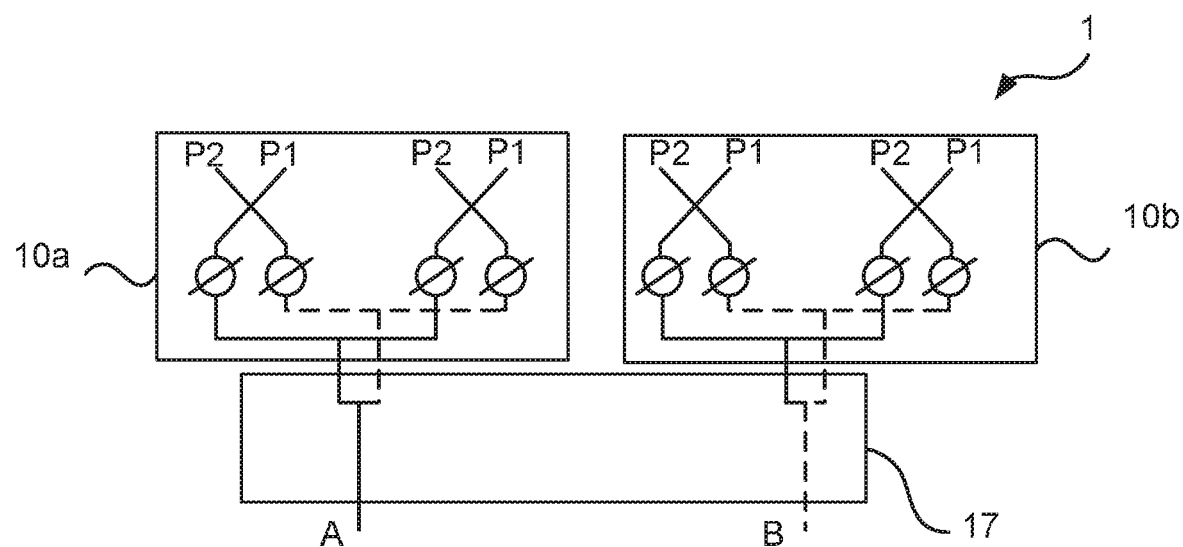
FIG. 6 illustrates a configuration for dual polarized beamforming according to the present teachings.

FIG. 6 illustrates the antenna arrangement 1 wherein the reconfigurable feed network 17 is in a second mode, in particular a configuration for dual polarization beamforming. In the second mode, the antenna array 10 may be seen as reconfigured into two smaller arrays: a first antenna array 10a and a second antenna array 10b. Thus, half of the elements are connected to a respective port A, B. That is, the feed network 17 connects half of the elements of having the first polarization P1 and half of the elements having the second polarization P2 to the first port. Correspondingly, the feed network 17 connects the remaining half of the elements having the first polarization P1 and the remaining half of the elements having the second polarization P2 to the second port. The antenna array 10 may thus be seen as reconfigured into the two smaller antenna arrays 10a, 10b, or, stated differently, the elements of the antenna array 10 may be seen as divided into two groups. In FIG. 6, the reconfigurable feed network 17 is in a dual polarization mode, while still offering two ports A, B.

Figure 7A:
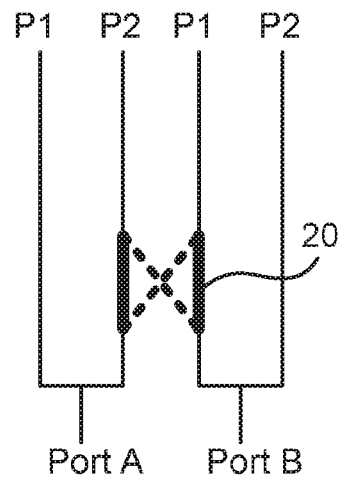
FIG. 7 illustrates a functional view of the reconfiguration network.
Figure 7B:
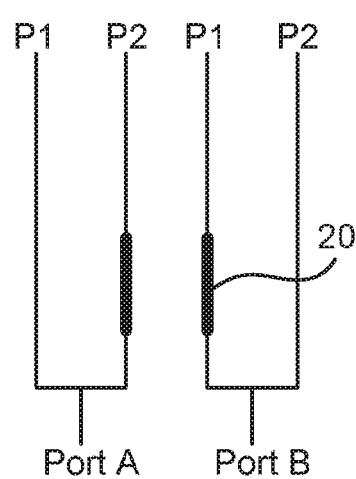
Figure 7C:
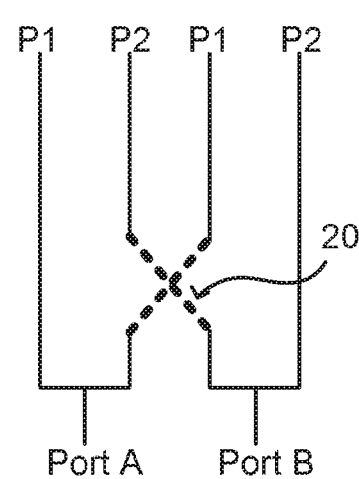

FIG. 7a illustrates a functional view of the reconfigurable feed network 17. The reconfiguration of the feed network 17 may functionally be implemented by means of a switch means 20, e.g. a switching network. Connection for both operation modes (SPBF and DPBF) are shown in FIG. 7a. The first mode, i.e. the single polarization mode is shown in the figure with bold dotted lines (see also FIG. 7c), while the second mode, i.e. the dual polarization mode is shown in the figure with bold solid lines (see also FIG. 7b).

Figure 8:
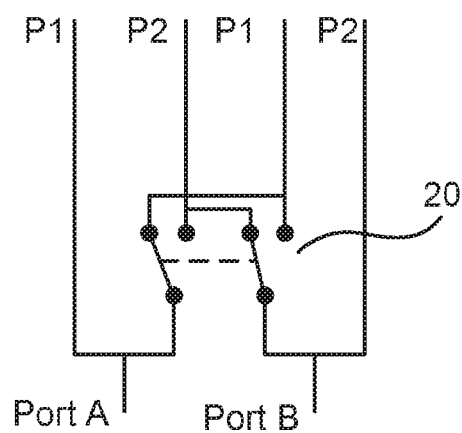
FIG. 8 illustrates a principal sketch showing implementation of a switch network according to the present teachings.

FIG. 8 illustrates an exemplary implementation of a switching means 20 according to the present teachings. The switching means 20 may be implemented by means of switches, preferably by electronic switches, e.g. insulated-gate bipolar transistors (IGBTs) but the switching means 20 may alternatively be implemented by mechanical switches.

On reception there will be no or only minor impact on link budget when comparing a single dual polarization port according to a prior art configuration and a configuration according to the herein disclosed embodiments with two dual polarization ports, since both configurations generate the same beamwidths. That is, at reception there is no or only minor differences between the configurations when accounting all gains and losses from the transmitter through the medium to the receiver. There may be a minor difference in that there may be some losses in the switching means 20 for the embodiments according to the present teachings. An important benefit when using the antenna arrangement 1 according to the various embodiments disclosed herein, is that two ports with orthogonal polarization can be formed instead of only one as in prior art.

On transmission, however, there will be a larger impact on the link budget when using two dual polarized ports compared to a single dual polarized port. It is noted that it is not primarily the principle for beamforming that matters but the fact that power amplifier resource, whether being distributed in the aperture or a single power amplifier at each port, will be shared by two ports instead of one. However, with the proposed invention, it is possible to switch between one and two dual polarized ports, and of course, the two port operation setting should only be used when link budget allows and the, single, dual polarized port is created otherwise.

The various embodiments that have been described can be implemented both at a TRP and at a UE and is applicable for antenna arrays with or without receivers/transmitters close to the radiating antenna elements.

The thus far described antenna arrangement 1 comprising the reconfigurable feed network 17 has a number of advantages. For instance, the antenna feed network 17 supports dual ports, irrespective of the beamwidth of the radiation patterns. Further, the antenna feed network 17 can be configured for either single polarization beamforming or dual polarization beamforming per each port. Which particular configuration to use depends mainly on the desired beamwidth. For instance, if sending user specific data, a narrow beam may be desirable, and hence, for instance, a base station comprising or being connected to the described antenna arrangement 1 may switch to the dual-polarization mode (as described e.g. in relation to FIG. 6) when transmitting e.g. system information. System information typically needs to be transmitted to all, or at least most of, wireless devices (i.e., broadcasted or multicast) in the coverage area served by the base station, and may hence be transmitted with wide coverage in order to reach all wireless devices. If instead a narrow beam is desired, e.g. when sending user data, the base station may switch to the single polarization mode (as described e.g. in relation to FIG. 5).

Various features and embodiments have been described of an antenna arrangement. These features and embodiments may be combined in many different ways, examples of which are given next.

An antenna arrangement 1 is provided comprising a dual polarized antenna array 10 and a reconfigurable feed network 17 connected thereto. The dual polarized antenna array 10 comprises a number of radiating antenna elements and the reconfigurable feed network 17 comprises switching means 20 for switching the feed network 17 between:
  a first mode providing single polarization beamforming, SPBF, in which first mode the feed network 17 is arranged such as to connect all antenna elements having a first polarization P1 to a first port A and all antenna elements having a second polarization P2 to a second port B and
  a second mode providing dual-polarization beamforming, DPBF, in which second mode the feed network 17 connects a part of all antenna elements having a first polarization P1 and a part of all antenna elements having a second polarization to the first port, A, and a remaining part of all antenna elements having the first polarization P1 and the remaining part of all antenna elements having the second polarization P2 to the second port B.

The reconfigurable feed network 17 is arranged such that the antenna arrangement 1 can be used for narrow beams and wide beams, while offering two ports for both cases. The feed network 17 can be made switchable between these two modes by the switching means 20, implemented e.g. by semiconductor switches.

In an embodiment, in particular in the second mode, the antenna elements of the antenna array 10 are functionally arranged into a first and a second antenna array 10a, 10b (such as e.g. described in relation to FIG. 6). In such embodiments, each of the first antenna array 10a and of the second antenna array 10b are arranged along a dimension for which the beam shall be broadened.

The (virtual) division of the antenna array 10 into two antenna arrays 10a, 10b is preferably performed along the dimension for which the beam shall be broadened. Selecting which elements to use in this way gives the best possible performance.

In various embodiments, the antenna arrangement 1 is arranged to be switched to the first mode upon a transmission requiring a narrow beam. As described earlier, a narrow beam is required e.g. when user specific information is to be sent.

In various embodiments, the antenna arrangement 1 is arranged to be switched to the second upon a transmission requiring a wide beam. As also described earlier, a broad beam is required when e.g. system information is to be sent, when there is a need to broadcast or multicasting information.

In various embodiments, in particular in the second mode, the part of all antenna elements having a first polarization P1 comprises half of all these antenna elements, and the part of all antenna elements having the second polarization P2 comprises half of all these antenna elements. However, many other configurations are also possible.

Figure 9:
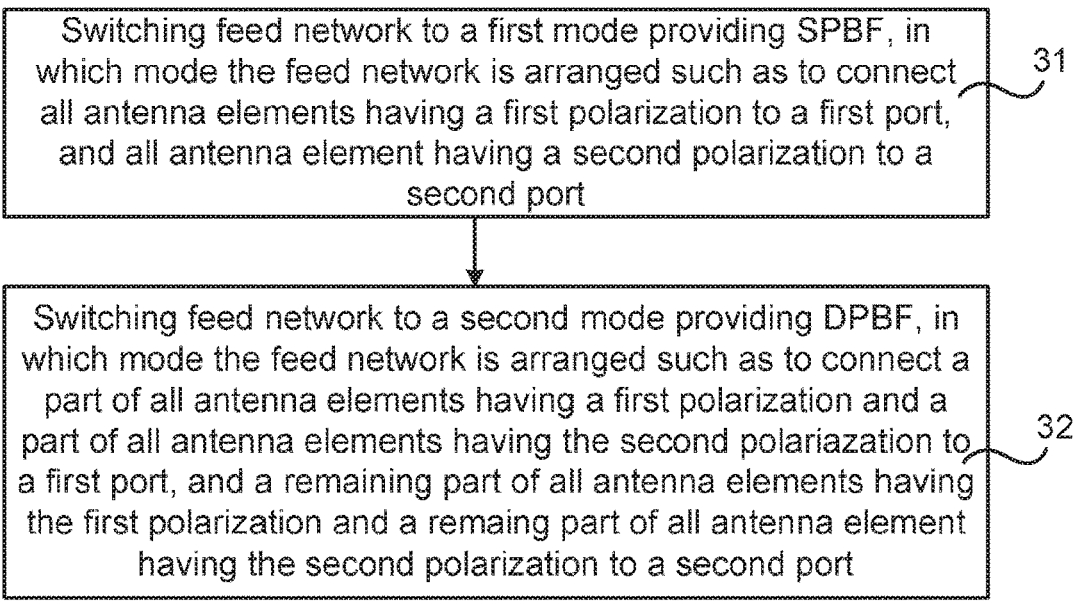
FIG. 9 illustrates a flow chart over steps of an embodiment of a method in a network node in accordance with the present teachings.

FIG. 9 illustrates a flow chart over steps of an embodiment of a method in a device 50 in accordance with the present teachings. The method 30 may be implemented by a device 50 such as, for instance, a UE or a base station. Further, the method 30 may be used when transmitting and/or when receiving.

A method 30 for beamforming is provided. The method 30 may be performed by a device 50 using an antenna arrangement 1 as has been described, in particular using an antenna arrangement 1 comprising a dual polarized antenna array 10 and a reconfigurable feed network 17 connected thereto, the dual polarized antenna array 10 comprising a number of radiating antenna element. The method 30 comprises:

switching 31 the feed network 17 to a first mode providing single polarization beamforming, SPBF, in which first mode the feed network 17 is arranged such as to connect all antenna elements having a first polarization P1 to a first port, A, and all antenna elements having a second polarization P2 to a second port, B, and switching 32 the feed network 17 to a second mode providing dual-polarization beamforming, DPBF, in which second mode the feed network 17 connects a part of all antenna elements having a first polarization P1 and a part of all antenna elements having a second polarization P2 to the first port, A, and a remaining part of all antenna elements having the first polarization P1 and the remaining part of all antenna elements having the second polarization P2 to the second port, B.

In an embodiment, in the second mode, the antenna elements of the antenna array 10 are functionally arranged into a first and a second antenna array 10a, 10b and wherein each of the first antenna array 10a and of the second antenna array 10b are arranged along a dimension for which the beam shall be broadened.

In an embodiment, the method 30 comprises switching to the first mode upon having a transmission requiring a narrow beam.

In an embodiment, the method 30 comprises switching to the second upon a transmission requiring a wide beam.

In various embodiments, in the second mode, the part of all antenna elements having a first polarization P1 comprises half of all these antenna elements, and the part of all antenna elements having the second polarization P2 comprises half of all these antenna elements.

In various embodiments, the method 30 is implemented in a device 50 being a communications device for wireless communication.

In various embodiments, the method 30 is implemented in a device 50 being an access point providing wireless communications to communications devices. In such cases, the antenna arrangement 1 may be connected to the access point and be controllable by the access point, e.g. by a control device, e.g. processing circuitry, of the access point.

Figure 10:
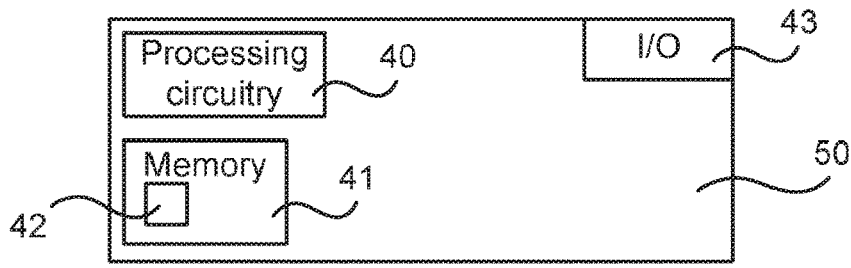
FIG. 10 illustrates schematically a network node and means for implementing embodiments of the method in accordance with the present teachings.

FIG. 10 illustrates schematically a device and means for implementing embodiments of the method in accordance with the present teachings. As noted above, the method 30 may be implemented in a communications device and/or in an access point (e.g. a base station, eNB, gNB etc.).

The device 50 comprises or is connected to an antenna arrangement 1 as has been described in various embodiments. The antenna arrangement 1 may, for instance, be adapted for transmission and reception of radio frequency signaling.

The device 50 comprises processing circuitry 40, which may be any combination of one or more of a suitable central processing unit (CPU), multiprocessor, microcontroller, digital signal processor (DSP), etc., capable of executing software instructions stored in a computer program product 41, e.g. in the form of a storage medium 41. The processing circuitry 40 may further be provided as at least one application specific integrated circuit (ASIC), or field programmable gate array (FPGA).

The processing circuitry 40 is configured to cause the device 50 to perform a set of operations, or steps, e.g. as described in relation to FIG. 9. For example, the storage medium 41 may store the set of operations, and the processing circuitry 40 may be configured to retrieve the set of operations from the storage medium 41 to cause the device 50 to perform the set of operations. The set of operations may be provided as a set of executable instructions. The processing circuitry 40 is thereby arranged to execute method as disclosed herein.

The device 50 also comprises input/output means 43 (denoted I/O) for communicating wirelessly and/or in a wired manned with other entities and devices. The input/output means 43 may, for instance, comprise a protocol stack, for communication with network nodes in a wired manner and/or with communication devices in a wireless manner. The input/output means 43 may be used for receiving data input and for outputting data, e.g. conveying IP packets. The device 1, 2 may comprise receiving circuitry and transmitting circuitry. The device 1, 2 also comprises or is connected to one or more analog antenna arrangements 1 as has been described, for communication over a wireless link.

Figure 11:
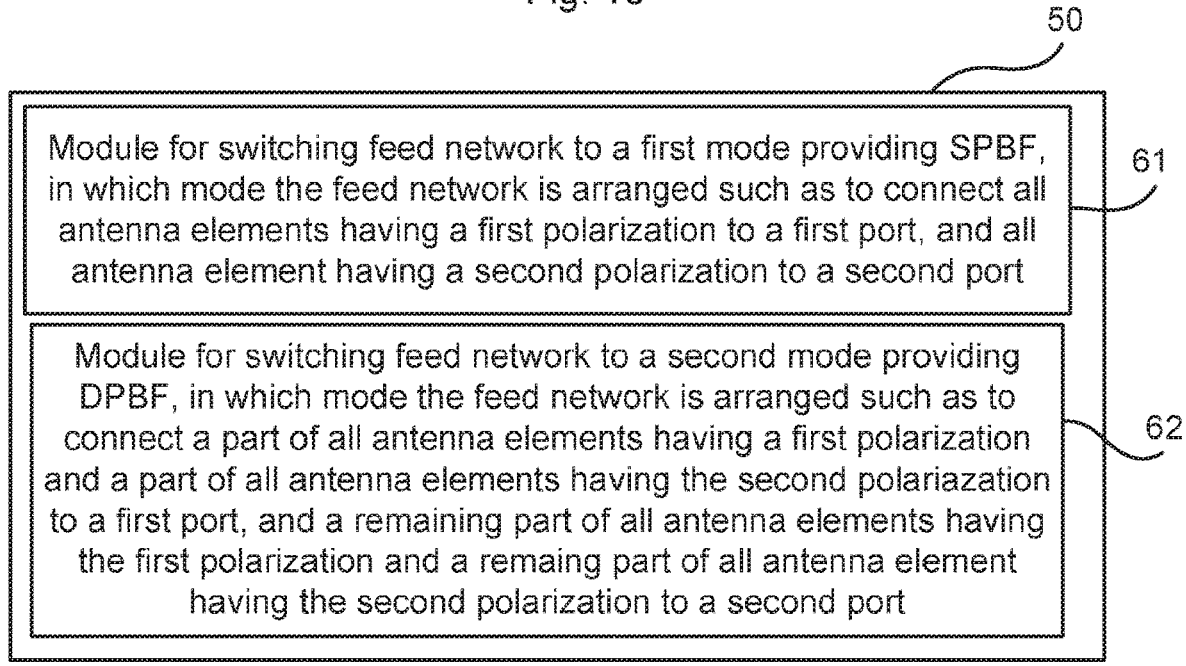
FIG. 11 illustrates a network node comprising function modules/software modules for implementing embodiments of the present teachings.

FIG. 11 illustrates a device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 that has been described in various embodiments.

A device 50 is provided for beamforming. The device comprises a first module 61 for switching a feed network to a first mode providing single polarization beamforming, in which first mode the feed network is arranged such as to connect all antenna elements having a first polarization P1 to a first port, A, and all antenna elements having a second polarization P2 to a second port, B. The first module 61 may, for instance, comprise a switching network for switching the feed network to the first mode.

The device comprises a second module 62 for switching the feed network to a second mode providing dual-polarization beamforming, in which second mode the feed network connects a part of all antenna elements having a first polarization P1 and a part of all antenna elements having a second polarization P2 to the first port, A, and a remaining part of all antenna elements having the first polarization P1 and the remaining part of all antenna elements having the second polarization P2 to the second port, B. The second module 62 may, for instance, comprise a switching network for switching the feed network to the second mode.

It is noted that the first and second module 61, 62 may be implemented by a single switching network arranged to switch the feed network to the different modes. It is further noted that the first and second modules 61, 62 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A user equipment (UE), the UE comprising:
an antenna arrangement comprising:
an antenna array comprising: a first set of at least two antenna elements and a second set of at least two antenna elements, wherein i) each antenna element included in the first set of antenna elements has a first polarization (P1) and ii) each antenna element included in the second set of antenna elements has a second polarization (P2) that is different than the first polarization (P1); and
a reconfigurable feed network connected to the antenna array, wherein
the reconfigurable feed network comprises a switching network comprising one or more physical switches for switching the reconfigurable feed network between:
A) a first mode providing single polarization beamforming (SPBF), in which first mode the physical switches of the reconfigurable feed network: i) connects to a first port (Port-A) each antenna element included in the first set of antenna elements and ii) connects to a second port (Port-B), which is separate from the first port (Port-A), each antenna element included in the second set of antenna elements, wherein, in the first mode, no antenna element having the second polarization is connected to Port-A and no antenna element having the first polarization is connected to Port-B, and
B) a second mode providing dual-polarization beamforming (DPBF), in which second mode the physical switches of the reconfigurable feed network: i) connects to the first port (Port-A) both: 1) a first subset of the first set of antenna elements and 2) a first subset of the second set of antenna elements such that at least one antenna element having the first polarization (P1) is connected to Port-A and at least one antenna element having the second polarization (P2) is also connected to Port-A and ii) connects to the second port (Port-B) both: 1) a second subset of the first set of antenna elements and 2) a second subset of the second set of antenna elements such that at least one antenna element having the first polarization (P1) is connected to Port-B and at least one antenna element having the second polarization (P2) is also connected to Port-B, and
each recited subset of antenna elements comprises at least one antenna element, and further wherein
the UE is not a base station or a component of a base station.

2. The UE of claim 1, wherein, in the second mode, the antenna elements of the antenna array are functionally arranged into a first and a second antenna array and wherein each of the first antenna array and of the second antenna array are arranged along a dimension for which the beam shall be broadened.

3. The UE of claim 1, arranged to be switched to the first mode upon a transmission requiring a narrow beam.

4. The UE of claim 1, arranged to be switched to the second mode upon a transmission requiring a wide beam.

5. The UE of claim 1, wherein
half of the antenna elements from the first set of antenna elements are included in the first subset of the first set of antenna elements, and
half of the antenna elements from the second set of antenna elements are included in the first subset of the second set of antenna elements.

6. A method for beamforming performed by user equipment (UE) using an antenna arrangement comprising a dual polarized antenna array and a reconfigurable feed network connected thereto, the dual polarized antenna array comprising a number of radiating antenna elements, the method comprising:
switching the feed network to a first mode providing single polarization beamforming (SPBF), in which first mode the feed network is arranged such as to connect all antenna elements having a first polarization P1 to a first port, A, and all antenna elements having a second polarization P2 to a second port, B; and
switching the feed network to a second mode providing dual-polarization beamforming (DPBF), in which second mode the feed network connects a part of all antenna elements having a first polarization P1 and a part of all antenna elements having a second polarization P2 to the first port, A, and a remaining part of all antenna elements having the first polarization P1 and a remaining part of all antenna elements having the second polarization P2 to the second port, B, wherein
the UE is not a base station or a component of a base station.

7. The method as claimed in claim 6, wherein, in the second mode, the antenna elements of the antenna array are functionally arranged into a first and a second antenna array and wherein each of the first antenna array and of the second antenna array are arranged along a dimension for which the beam shall be broadened.

8. The method as claimed in claim 6, further comprising switching to the first mode upon a transmission requiring a narrow beam.

9. The method as claimed in claim 6, further comprising switching to the second mode upon a transmission requiring a wide beam.

10. The method as claimed in claim 6, wherein
   one half of all of the antenna elements having the first polarization P1 are connected to the first port; and
   one half of all of the antenna elements having the second polarization P2 are connected to the first port.

11. The method as claimed in claim 6, wherein the UE is a mobile phone.

12. A computer program product comprising a non-transitory computer readable medium storing a computer program for a user equipment (UE), the computer program comprising computer program code, which, when run on processing circuitry of the UE causes the UE to perform the method of claim 6.

13. The UE of claim 1, wherein the one or more physical switches comprise one or more electronic switches.

14. The UE of claim 1, wherein the one or more physical switches comprise one or more mechanical switches.

* * * * *